US011293816B2

(12) United States Patent
Horton et al.

(10) Patent No.: US 11,293,816 B2
(45) Date of Patent: Apr. 5, 2022

(54) INERTIAL MEASUREMENT APPARATUS AND METHOD WITH IMPROVED THERMAL AND NOISE PERFORMANCE

(71) Applicant: ACEINNA Transducer Systems Co., Ltd., Wuxi (CN)

(72) Inventors: Mike Horton, Wuxi (CN); Shu Wang, Wuxi (CN)

(73) Assignee: ACEINNA Transducer Systems Co., Ltd., Jiangsu (CN)

( * ) Notice: Subject to any disclaimer, the term of this patent is extended or adjusted under 35 U.S.C. 154(b) by 0 days.

(21) Appl. No.: 17/022,123

(22) Filed: Sep. 16, 2020

(65) Prior Publication Data

US 2021/0080334 A1  Mar. 18, 2021

(30) Foreign Application Priority Data

Sep. 17, 2019  (CN) .......................... 201910875039.0

(51) Int. Cl.
| | |
|---|---|
| *G01K 15/00* | (2006.01) |
| *G01P 15/18* | (2013.01) |
| *G01P 1/00* | (2006.01) |
| *G01P 15/08* | (2006.01) |
| *G01C 19/5712* | (2012.01) |
| *G01C 21/16* | (2006.01) |
| *G01P 21/00* | (2006.01) |
| *G01C 25/00* | (2006.01) |
| *G01C 21/18* | (2006.01) |

(52) U.S. Cl.
CPC ....... *G01K 15/005* (2013.01); *G01C 19/5712* (2013.01); *G01C 21/16* (2013.01); *G01C 21/18* (2013.01); *G01C 25/005* (2013.01); *G01P 1/00* (2013.01); *G01P 15/08* (2013.01); *G01P 15/18* (2013.01); *G01P 21/00* (2013.01)

(58) Field of Classification Search
CPC .. G01K 15/005; G01C 19/5712; G01C 21/16; G01C 25/005; G01C 21/18; G01P 1/00; G01P 15/08; G01P 15/18; G01P 21/00
See application file for complete search history.

(56) References Cited

U.S. PATENT DOCUMENTS

| | | | | |
|---|---|---|---|---|
| 2009/0288485 | A1* | 11/2009 | Ell ......................... | G01P 3/44 73/504.03 |
| 2013/0068017 | A1* | 3/2013 | Perkins .............. | G01C 19/5783 73/504.02 |
| 2016/0047675 | A1* | 2/2016 | Tanenhaus ........... | G01C 25/005 702/104 |

* cited by examiner

*Primary Examiner* — Natalie Huls
*Assistant Examiner* — Cynthia L Davis
(74) *Attorney, Agent, or Firm* — EcoTech Law Group, P.C.

(57) ABSTRACT

Inertial measurement systems and methods are described. An exemplar inertial measurement system includes: a plurality of inertial sensors each configured to output an inertial sensing signal; a filter module configured to separate the inertial sensing signal of at least one of the plurality of inertial sensors into a low-frequency component and a high-frequency component; a temperature calibration module configured to perform a temperature calibration on the low-frequency component of the inertial sensing signal of the at least one of the plurality of inertial sensors; a noise reduction module configured to perform a noise reduction on the high-frequency component of the inertial sensing signal of the at least one of the plurality of inertial sensors; and a recombination module configured to recombine the calibrated low-frequency component and the noise reduced high-frequency component to form a recombined inertial sensing signal with improved thermal drift performance and noise performance.

16 Claims, 4 Drawing Sheets

INERTIAL MEASUREMENT APPARATUS AND METHOD WITH IMPROVED THERMAL AND NOISE PERFORMANCE

RELATED APPLICATION

This application claims the priority from CN Application having serial number 201910875039.0, filed on Sep. 17, 2019, which are incorporated herein by reference for all purposes.

FIELD OF THE INVENTION

The present invention relates to the field of inertial measurement, and in particular to an inertial measurement apparatus and an inertial measurement method with improved thermal and noise performance.

BACKGROUND TECHNIQUE

An inertial measurement unit (IMU) is an electronic device that measures and reports an acceleration, an angular rate, and sometimes a magnetic field surrounding a body thereof, using a combination of accelerometers and gyroscopes, sometimes also magnetometers.

Figure 1:
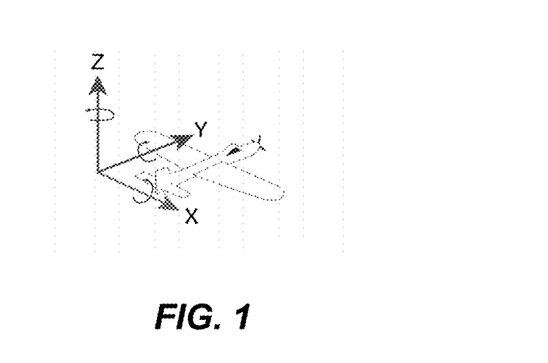
FIG. 1 is a schematic principle diagram of a conventional IMU.

As shown in FIG. 1, the IMU detects a linear acceleration through one or more accelerometers, and detects a rotation rate through one or more gyroscopes. Some IMUs further include a magnetometer usually used as a heading reference. One accelerometer and one gyroscope are configured for each of three axes (a pitch, a roll, and a yaw, X, Y, Z). In one implementation, the IMU includes at least one 3-axis accelerometer and at least one 3-axis gyroscope. Optionally, the IMU may further include at least one 3-axis magnetometer. In addition, the IMU may be further coupled to a GPS and/or other sensors. The IMU can directly or indirectly estimate a position and an orientation. In another implementation, the IMU communicates with a vehicle to control steering, stability, or balance of the vehicle.

Figure 2:
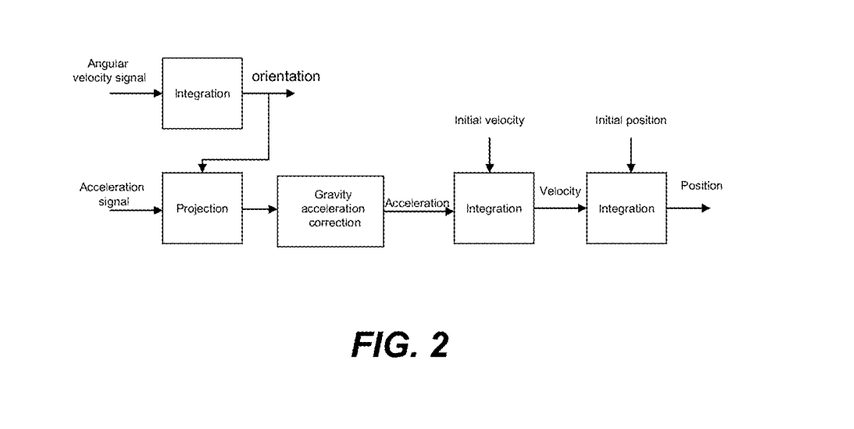
FIG. 2 is a principle diagram showing a conventional IMU for estimating an orientation and a position.

As shown in FIG. 2, the IMU can estimate its orientation and position according to an angular velocity signal and an acceleration signal that it receives. The IMU estimates or updates the orientation by accumulating or integrating the angular velocity signals. The IMU estimates or updates the position according to the estimated orientation and the acceleration signal. There are at least four stages during the process of estimating the position of the IMU. The IMU first uses the estimated orientation and the acceleration signal to project the acceleration signal onto a global axis. Then, the IMU corrects the projected acceleration signal according to gravity and generates a global acceleration signal. The IMU can estimate the velocity according to the generated global acceleration signal and an initial velocity. Finally, the IMU can estimate and update the position according to the estimated velocity and an initial position.

Bias drift and noise of the IMU affect positioning accuracy based on the IMU. In the MEMS (micro-electromechanical system) based IMU, the bias drift is dominated by thermal errors (also called as thermal drift), and the noise is usually a function of the structure and the manufacturing tolerance of the IMU. The use of an array of IMUs to reduce noise by averaging is well known, but there is no solution for reducing the noise and the thermal drift simultaneously.

SUMMARY OF THE INVENTION

This section is for the purpose of summarizing some aspects of the present invention and to briefly introduce some preferred embodiments. Simplifications or omissions in this section as well as in the abstract may be made to avoid obscuring the purpose of this section and the abstract. Such simplifications or omissions are not intended to limit the scope of the present invention.

One objective of the present invention is to provide an inertial measurement apparatus and an inertial measurement method to reduce noise and thermal drift of the inertial sensing signal simultaneously.

In order to achieve the objective of the present invention, according to one aspect of the present invention, the present invention provides an inertial measurement apparatus, including: a plurality of inertial sensors each configured to output an inertial sensing signal; a filter module configured to separate the inertial sensing signal of at least one of the plurality of inertial sensors into a low-frequency component and a high-frequency component; a temperature calibration module configured to perform a temperature calibration on the low-frequency component of the inertial sensing signal of the at least one of the plurality of inertial sensors; a noise reduction module configured to perform a noise reduction on the high-frequency component of the inertial sensing signal of the at least one of the plurality of inertial sensors; and a recombination module configured to recombine the calibrated low-frequency component and the noise reduced high-frequency component to form a recombined inertial sensing signal.

According to another aspect of the present invention, the present invention provides an inertial measurement method, including: obtaining a plurality of inertial sensing signals through a plurality of inertial sensors; separating the inertial sensing signal of at least one of the plurality of inertial sensors into a low-frequency component and a high-frequency component; performing a temperature calibration on the low-frequency component of the inertial sensing signal of the at least one of the plurality of inertial sensors; performing a noise reduction on the high-frequency component of the inertial sensing signal of the at least one of the plurality of inertial sensors; and recombining the calibrated low-frequency component and the noise reduced high-frequency component to form a recombined inertial sensing signal.

In the present invention, the inertial sensing signals of the plurality of inertial sensors are separate into low-frequency components and high-frequency components, then temperature calibration is performed on the low-frequency components to optimize the thermal drift of the low-frequency components, and the noise reduction is performed on the high-frequency components to optimize noise performance of the high-frequency components. The calibrated low-frequency components and the noise reduced high-frequency components are recombined to form a recombined inertial sensing signal with improved thermal drift performance and noise performance.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will be better understood with regard to the following description, appended claims, and accompanying drawings where:

DETAILED DESCRIPTION OF THE INVENTION

The detailed description of the invention is presented largely in terms of procedures, steps, logic blocks, processing, and other symbolic representations that directly or indirectly resemble the operations of communication or storage devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The present invention provides an inertial measurement apparatus. Inertial sensing signals outputted by a plurality of inertial sensors are separate into low-frequency components and high-frequency components. Then, a temperature calibration is performed on the low-frequency components to optimize thermal drift of the low-frequency components and a noise reduction is performed on the high-frequency components to optimize noise performance of the high-frequency component. Finally, the calibrated low-frequency components and the noise reduced high-frequency components are recombined to form a recombined inertial sensing signal with improved thermal drift performance and noise performance.

Figure 3:
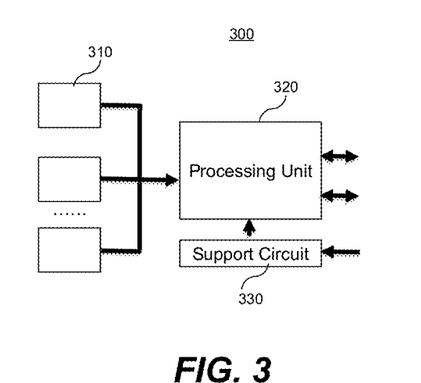
FIG. 3 is a structural diagram showing an inertial measurement apparatus according to one embodiment of the present invention.

As shown in FIG. 3, the inertial measurement apparatus 300 includes a plurality of IMUs 310, a processing unit 320 and a support circuit 330.

Three IMUs 310 are shown as an example in FIG. 3. Actually, two, three, four or more IMUs 310 may be disposed according to requirement. These IMUs 310 are referred to as an inertial measurement array. Each IMU 310 includes one 3-axis accelerometer and one 3-axis gyroscope. Optionally, the IMU 310 further includes at least one 3-axis magnetometer. In some embodiments, each IMU 310 may also include one or more single-axis accelerometers and/or one or more single-axis gyroscopes according to requirement. The 3-axis accelerometer can obtain acceleration signals of three axes in a working state, and the 3-axis gyroscope can obtain angular velocity signals of three axes in a working state. The accelerometer, the gyroscope, and the magnetometer all are referred to as inertial sensors.

The processing unit 320 may be a micro processing unit (MCU). The processing unit 320 is supported by the support circuit 330 and provides various interfaces, such as UART and SPI interfaces. The SPI or UART interface provides open connections to various host platforms. The IMU 310 is individually or jointly coupled to the processing unit 320, and provides inertial sensing signals to the processing unit 320. The processing unit 320 coordinates and controls the three IMUs and host a good portion of the signal processing load. In one embodiment, the processing unit 320 includes several logic units which can perform digital signal filtering, sensing data enhancement processing, and the like.

The support circuit 330 provide a combination of power, frequency, storage, clock function to the processing unit 320. The support circuit 330 has a power input of 3.5 volts. The power input is provided though an alternating current-direct current (AC-DC) adapter or a battery. In one embodiment, the inertial measurement apparatus further includes an analog front end configured to filter and digitize the inertial sensing signal output for processing by the logic unit of the processing unit 320.

Figure 4:
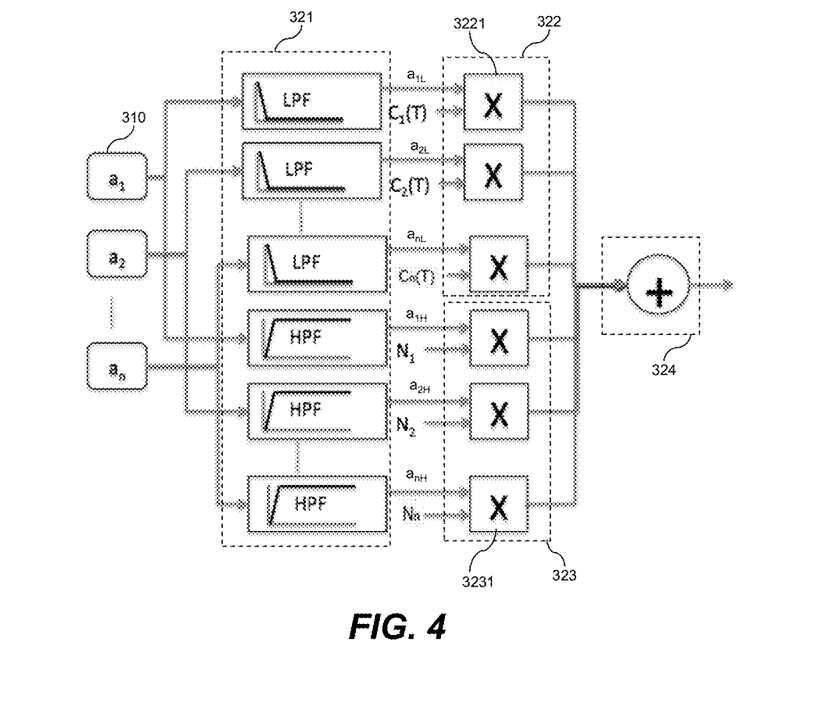
FIG. 4 is a schematic diagram showing a working principle of the inertial measurement apparatus according to one embodiment of the present invention.

FIG. 4 is a schematic diagram showing a working principle of the inertial measurement apparatus according to the present invention. The inertial sensors 310 provide a plurality of inertial sensing signals $a_1$, $a_2$, and $a_n$ respectively, where n is the number of inertial sensors 310 and may be greater than or equal to 2. The inertial sensing signals $a_1$, $a_2$, and $a_n$ belongs to the same type. For example, all the inertial sensing signals $a_1$, $a_2$, and $a_n$ are the acceleration signals of x-axis of the plurality of 3-axis accelerometers. The processing unit 320 includes a filter module 321, a temperature calibration module 322, a noise reduction module 323, and a recombination module 324.

In another embodiment, the filter module 321, the temperature calibration module 322, the noise reduction module 323, and the recombination module 324 can be implemented in another independent module, instead of in the processing unit 320. The processing unit 320 is configured for processing a recombined inertial sensing signal.

The filter module 321 separates the inertial sensing signal of each inertial sensor 310 into a low-frequency component and a high-frequency component. Specifically, the filter module 321 includes a plurality of low-pass filters (LPF) and a plurality of high-pass filters (HPF) complementary to the plurality of LPFs. Each LPF performs low-pass filtering on the inertial sensing signal $a_1$, $a_2$, or $a_n$ of one inertial sensor 310 to obtain the low-frequency component $a_{1L}$, $a_{2L}$, or $a_{nL}$ of the inertial sensing signal $a_1$, $a_2$, or $a_n$ of the one inertial sensor 310. Each HPF performs high-pass filtering on the inertial sensing signal $a_1$, $a_2$, or $a_n$ of one inertial sensor to obtain the high-frequency component $a_{1H}$, $a_{2H}$, or $a_{nH}$ of the inertial sensing signal of the one inertial sensor. The LPF and the HPF corresponding to the same inertial sensing signal are complementary. The LPF and the HPF may be implemented through a traditional IIR or FIR or other standard filter mechanisms. Digital stability needs to be ensured. The LPF and the HPF need to use same cut-off frequency (e.g. 0.1 Hz) to ensure that no scale factor or amplitude response distortion is introduced.

The temperature calibration module 322 is configured to perform a temperature calibration on the low-frequency component of the inertial sensing signal of each of the inertial sensors. Specifically, the temperature calibration module 322 includes a plurality of temperature calibration units 3221. Each of the temperature calibration units 3221 is configured to multiply one low-frequency component $a_{1L}$, $a_{2L}$ or $a_{nL}$, of the inertial sensing signal of one inertial sensor by corresponding temperature calibration coefficient $C_1(T)$, $C_2(T)$ or $C_n(T)$ to obtain the calibrated low-frequency component.

It should be noted that even if there is no rotation or acceleration, the gyroscope and the accelerometer inside the IMU still output a non-zero value, which is called as bias drift. When the IMU is tested within a temperature range, the bias drift varies with the temperature. In addition, the output of the inertial sensor exhibits hysteresis which is a function of temperature. This means that output errors of the inertial sensors at a same temperature are not a consistent value, but a function of a "thermal history" of the IMU, so that each inertial sensor can form one residual temperature error loop.

Figure 5:
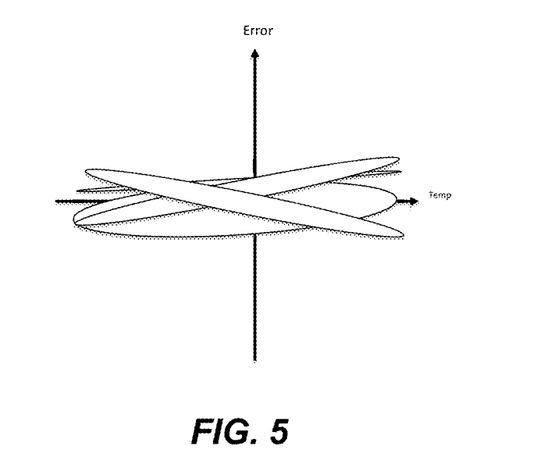
FIG. 5 is a schematic diagram showing four residual temperature error loops of four inertial sensors according to one embodiment of the present invention.

A width of this error loop limits calibration accuracy that can be achieved using a common temperature compensation technology, such as polynomial or piecewise linear fitting. In addition, the width of this error loop varies greatly between IMUs, and some IMUs have error loops that are wider than that of other IMUs at some temperatures. FIG. 5 is a schematic diagram showing four residual temperature error loops of four sensors, such as four rate gyroscopes or four accelerometers.

In order to minimize effect of uncertainty due to hysteresis at any given temperature, the sensors are optimally combined by more heavily weighting "best" sensors at any given temperature. The "best" sensor is determined by considering the error loop as a probability error function, and a width of the error loop is used as a measure of a standard deviation at any given temperature. Algorithms such as least squares fitting with constraints can be used to determine optimal weighting coefficients of the n sensors.

Figure 6:
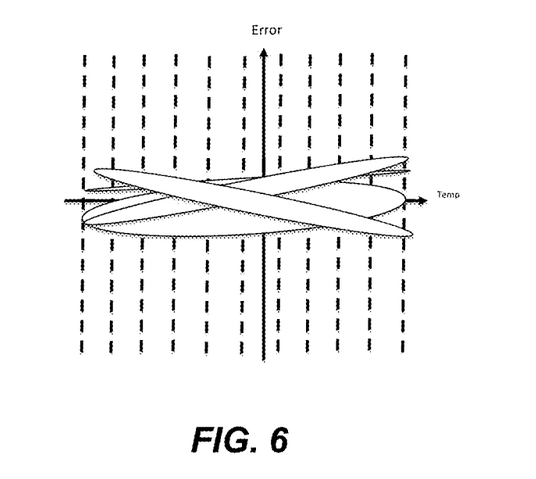
FIG. 6 is a schematic diagram showing that the residual temperature error loops are divided into a plurality of temperature windows at a predetermined temperature interval according to one embodiment of the present invention.

In a preferred embodiment, a set of temperature calibration coefficients $C_1(T)$, $C_2(T)$, and $C_n(T)$ of the inertial sensors is obtained through the following operations:

measuring a temperature response of the inertial sensing signal $a_1$, $a_2$ or $a_n$ of each of the inertial sensors, and performing a temperature compensation on each of the inertial sensors through piecewise linear fitting or polynomial fitting;

measuring a residual temperature error loop of each of the inertial sensors, and dividing the residual temperature error loops into a plurality of temperature windows at a predetermined temperature interval, as shown in FIG. 6, for example, the temperature interval may be 1 degree;

minimizing a total error of each of the temperature windows through least squares fitting with constraints; and acquiring a set of temperature calibration coefficients of each of the inertial sensors so that the total error of each of the temperature windows is minimized, wherein the constraints are that a sum of the set of temperature calibration coefficients is 1, that is, $C_1(T)+C_s(T)+ \ldots C_n(T)=1.0$.

The obtained set of temperature calibration coefficients of each of the inertial sensors is stored in a memory. In the temperature calibration performed subsequently, the stored temperature calibration coefficients may be used for the temperature calibration.

In another embodiment, a set of temperature calibration coefficients may be set for each given temperature window of each of the inertial sensors, that is, a plurality of sets of temperature calibration coefficients are set. In this embodiment, a plurality of sets of temperature calibration coefficients $C_1(T)$, $C_2(T)$, and $C_n(T)$ of the inertial sensors are obtained through the following operations:

measuring a temperature response of the inertial sensing signal $a_1$, $a_2$ or $a_n$ of each of the inertial sensors, and performing a temperature compensation on each of the inertial sensors through piecewise linear fitting or polynomial fitting;

measuring a residual temperature error loop of each of the inertial sensors, and dividing the residual temperature error loops into a plurality of temperature windows at a predetermined temperature interval; and acquiring a set of temperature calibration coefficients of each of the temperature windows through least squares fitting with constrains to minimize a total error of each given temperature window, wherein the constrains are that a sum of the set of temperature calibration coefficients is 1, that is, $C_1(T)+C_s(T)+ \ldots C_n(T)=1.0$.

The noise reduction module 323 is configured to perform a noise reduction on the high-frequency component of the inertial sensing signal of each of the inertial sensors 310. Specifically, the noise reduction module 323 includes a plurality of noise reduction units 3231. Each noise reduction unit is configured to multiply the high-frequency component $a_{1H}$, $a_{2H}$, or $a_{nH}$ of the inertial sensing signal of one inertial sensor by a corresponding noise reduction coefficient $N_1$, $N_2$, or $N_n$ to obtain the noise reduced high-frequency component.

A set of noise reduction coefficients $N_1$, $N_2$, and $N_n$ of the inertial sensors is obtained through the following operations:

measuring noise of the inertial sensing signal of each of the inertial sensors; and acquiring a set of noise reduction coefficients of the inertial sensors according to following formula to minimize a total noise (i.e. total RMS noise):

$$N_{Total}^2 = N_1 * N_{a1}^2 + N_2 * N_{a2}^2 + \ldots + N_n * N_{an}^2,$$

where $N_{Total}$ is the total noise, and $N_{a1}$ and $N_{an}$ are the noise reduction coefficients of the inertial sensing signals a1 and an.

The recombination module 324 is configured to recombine the calibrated low-frequency components and the noise reduced high-frequency components to form a recombined inertial sensing signal. In one embodiment, the calibrated low-frequency components and the noise reduced high-frequency components may be added together to obtain the recombined inertial sensing signal. Thermal drift and noise performance of the recombined inertial sensing signal are improved significantly.

In the present invention, the improvement at least 10 times in thermal drift performance can be achieved. The noise performance can also be greatly improved, and the improvement is related to a square root of the number of inertial sensors.

In one embodiment, the filtering (separating), the temperature calibration, the noise reduction, and the recombination need to be independently performed on each type of inertial sensors to improve thermal drift and noise of the inertial sensing signals of each type of the inertial sensors. When the inertial sensor is a three-axis accelerometer or a three-axis gyroscope, the filtering, the temperature calibration, the noise reduction, and the reorganization need to be independently performed on each axis of the three-axis accelerometer and/or the three-axis gyroscope.

Figure 7:
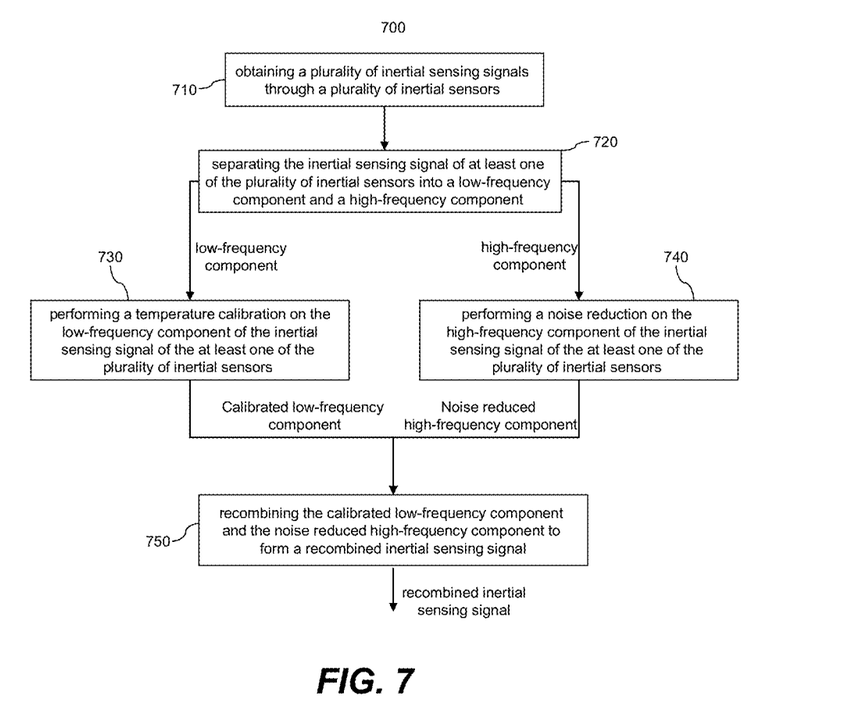
FIG. 7 is a schematic flowchart showing an inertial measurement method according to one embodiment of the present invention.

An example of the inertial measurement apparatus is described above. Obviously, the present invention may also be implemented as an inertial measurement method. FIG. 7 is a schematic flowchart showing an inertial measurement method 700 according to one embodiment according to the present invention. As shown in FIG. 7, the inertial measurement method 700 includes the following operations.

At 710, a plurality of inertial sensing signals is obtained through a plurality of inertial sensors.

At 720, the inertial sensing signal of at least one of the plurality of inertial sensors is separated into a low-frequency component and a high-frequency component.

At 730, a temperature calibration is performed on the low-frequency component of the inertial sensing signal of the at least one of the plurality of inertial sensors to obtain the calibrated low-frequency component.

At 740, a noise reduction is performed on the high-frequency component of the inertial sensing signal of the at least one of the plurality of inertial sensors to obtain the noise reduced high-frequency component.

In one embodiment, the at least one of the plurality of inertial sensors is all of the plurality of inertial sensors.

At 750, the calibrated low-frequency component and the noise reduced high-frequency component are recombined to form a recombined inertial sensing signal.

In one embodiment, the low-frequency component of the inertial sensing signal of each of the inertial sensors is multiplied by a corresponding temperature calibration coefficient to obtain the calibrated low-frequency component.

In a preferred embodiment, a set of temperature calibration coefficients $C_1(T)$, $C_2(T)$, and $C_n(T)$ of the inertial sensors is obtained through the following operations:

measuring a temperature response of the inertial sensing signal $a_1$, $a_2$ or $a_n$ of each of the inertial sensors, and performing a temperature compensation on each of the inertial sensors through piecewise linear fitting or polynomial fitting;

measuring a residual temperature error loop of each of the inertial sensors, and dividing the residual temperature error loops into a plurality of temperature windows at a predetermined temperature interval, as shown in FIG. 6, for example, the temperature interval may be 1 degree;

minimizing a total error of each of the temperature windows through least squares fitting with constraints; and acquiring a set of temperature calibration coefficients of each of the inertial sensors so that the total error of each of the temperature windows is minimized, wherein the constraints are that a sum of the set of temperature calibration coefficients is 1, that is, $C_1(T)+C_s(T)+ \ldots C_n(T)=1.0$.

In another embodiment, a set of temperature calibration coefficients may be set for each given temperature window of each of the inertial sensors, that is, a plurality of sets of temperature calibration coefficients are set. In this embodiment, a plurality of sets of temperature calibration coefficients $C_1(T)$, $C_2(T)$, and $C_n(T)$ of the inertial sensors are obtained through the following operations:

measuring a temperature response of the inertial sensing signal $a_1$, $a_2$ or $a_n$ of each of the inertial sensors, and performing a temperature compensation on each of the inertial sensors through piecewise linear fitting or polynomial fitting;

measuring a residual temperature error loop of each of the inertial sensors, and dividing the residual temperature error loops into a plurality of temperature windows at a predetermined temperature interval; and acquiring a set of temperature calibration coefficients of each of the temperature windows through least squares fitting with constrains to minimize a total error of each given temperature window, wherein the constrains are that a sum of the set of temperature calibration coefficients is 1, that is, $C_1(T)+C_s(T)+ \ldots C_n(T)=1.0$.

In one embodiment, the high-frequency component of the inertial sensing signal of each of the inertial sensors is multiplied by a corresponding noise reduction coefficient to obtain the noise reduced high-frequency component. Preferably, a set of noise reduction coefficients of the inertial sensors is obtained through the following operations:

measuring noise of the inertial sensing signal of each of the inertial sensors; and acquiring a set of noise reduction coefficients of the inertial sensors according to following formula to minimize a total noise and optimize total RMS noise:

$$N_{Total}^2 = N_1 * N_{a1}^2 + N_2 * N_{a2}^2 + \ldots + N_n * N_{an}^2,$$

where $N_{Total}$ is the total noise, and $N_{a1}$ and $N_{an}$ are the noise reduction coefficients of the inertial sensing signals a1 and an.

The foregoing embodiments and features in the embodiments may be combined with each other without conflict.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

What is claimed is:

1. An inertial measurement apparatus, comprising:
a plurality of inertial sensors each configured to output an inertial sensing signal,
a filter module configured to separate the inertial sensing signal of at least one of the plurality of inertial sensors into a low-frequency component and a high-frequency component;
a temperature calibration module configured to perform a temperature calibration on the low-frequency component of the inertial sensing signal of the at least one of the plurality of inertial sensors;
a noise reduction module configured to perform a noise reduction on the high-frequency component of the inertial sensing signal of the at least one of the plurality of inertial sensors;
a recombination module configured to recombine the calibrated low-frequency component and the noise reduced high-frequency component to form a recombined inertial sensing signal; and
wherein the filter module comprises a plurality of low-pass filters (LPF) each being configured to perform low-pass filtering on the inertial sensing signal of one inertial sensor to obtain the low-frequency component of the inertial sensing signal of the one inertial sensor, and a plurality of high-pass filters (HPF) complementary to the plurality of LPFs each being configured to perform high-pass filtering on the inertial sensing signal of one inertial sensor to obtain the high-frequency component of the inertial sensing signal of the one inertial sensor.

2. The inertial measurement apparatus according to claim 1, wherein the temperature calibration module comprises a plurality of temperature calibration units each being configured to multiply the low-frequency component of the inertial sensing signal of one inertial sensor by a corresponding temperature calibration coefficient to obtain the calibrated low-frequency component.

3. The inertial measurement apparatus according to claim 2, wherein a set of temperature calibration coefficients of the inertial sensors is obtained through following operations:
  measuring a temperature response of the inertial sensing signal of each of the inertial sensors, and performing temperature compensation on each of the inertial sensors through piecewise linear fitting or polynomial fitting;
  measuring a residual temperature error loop of each of the inertial sensors, and dividing the residual temperature error loops into a plurality of temperature windows at a predetermined temperature interval;
  minimizing a total error of each of the temperature windows through least squares fitting with constraints; and
  acquiring a set of temperature calibration coefficients of the inertial sensors so that the total error of each of the temperature windows is minimized, wherein the constraints are that a sum of the set of temperature calibration coefficients is 1.

4. The inertial measurement apparatus according to claim 2, wherein a plurality of sets of temperature calibration coefficients of the inertial sensors are obtained through following operations:
  measuring a temperature response of the inertial sensing signal of each of the inertial sensors, and performing temperature compensation on each of the inertial sensors through piecewise linear fitting or polynomial fitting;
  measuring a residual temperature error loop of each of the inertial sensors, and dividing the residual temperature error loops into a plurality of temperature windows at a predetermined temperature interval; and
  acquiring a set of temperature calibration coefficients of each of the temperature windows through least squares fitting with constraints to minimize a total error of the each of the temperature windows, wherein the constraints are that a sum of the sets of temperature calibration coefficients is 1.

5. The inertial measurement apparatus according to claim 1, wherein the noise reduction module comprises a plurality of noise reduction units each being configured to multiply the high-frequency component of the inertial sensing signal of one inertial sensor by a corresponding noise reduction coefficient to obtain the noise reduced high-frequency component.

6. The inertial measurement apparatus according to claim 5, wherein a set of noise reduction coefficients of the inertial sensors is obtained through following operations:
  measuring noise of the inertial sensing signal of each of the inertial sensors; and
  acquiring a set of noise reduction coefficients of the inertial sensors according to following formula to minimize a total noise:

$$N_{Total}^2 = N_1 * N_{a1}^2 + N_2 * N_{a2}^2 + \ldots + N_n * N_{an}^2,$$

Wherein $N_{Total}$ is the total noise, $N_{a1}$, $N_{a2}$, and $N_{an}$ are the noise of the inertial sensing signals a1, a2, and an, and $N_1$, $N_2$, $N_n$ are the noise reduction coefficients of the inertial sensing signals a1, a2, and an.

7. The inertial measurement apparatus according to claim 1, wherein the inertial sensors belong to a plurality of types, each type of inertial sensors comprises a plurality of inertial sensors, and the temperature calibration, the noise reduction, and recombining are independently performed on the each type of the inertial sensors.

8. The inertial measurement apparatus according to claim 7, wherein one type of inertial sensors is accelerometer, and another type of inertial sensors is gyroscope.

9. The inertial measurement apparatus according to claim 8, wherein one accelerometer and one gyroscope are grouped into one inertial measurement unit, such that the plurality of accelerometers and the plurality of gyroscopes are grouped into a plurality of inertial measurement units which are called as an inertial measurement array.

10. The inertial measurement apparatus according to claim 8, wherein the accelerometer is a three-axis accelerometer, the gyroscope is a three-axis gyroscope, and the temperature calibration, the noise reduction, and recombining are independently performed on each axis of the three-axis accelerometer and/or the three-axis gyroscope.

11. An inertial measurement method, comprising:
  obtaining a plurality of inertial sensing signals through a plurality of inertial sensors;
  separating the inertial sensing signal of at least one of the plurality of inertial sensors into a low-frequency component and a high-frequency component;
  performing a temperature calibration on the low-frequency component of the inertial sensing signal of the at least one of the plurality of inertial sensors;
  performing a noise reduction on the high-frequency component of the inertial sensing signal of the at least one of the plurality of inertial sensors;
  recombining the calibrated low-frequency component and the noise reduced high-frequency component to form a recombined inertial sensing signal; and
  wherein said separating an inertial sensing signal of at least one of the plurality of inertial sensors into a low-frequency component and a high-frequency component comprises:
    performing low-pass filtering on the inertial sensing signal of one inertial sensor by one of a plurality of low-pass filters (LPF) to obtain the low-frequency component of the inertial sensing signal of the one inertial sensor; and
    performing high-pass filtering on the inertial sensing signal of one inertial sensor by one of a plurality of high-pass filters (HPF) to obtain the high-frequency component of the inertial sensing signal of the inertial sensor.

12. The inertial measurement method according to claim 11, wherein the low-frequency component of the inertial sensing signal of each of the inertial sensors is multiplied by a corresponding temperature calibration coefficient to obtain the calibrated low-frequency component.

13. The inertial measurement method according to claim 11, wherein a set of temperature calibration coefficients of the inertial sensors is obtained through following operations:
  measuring a temperature response of the inertial sensing signal of each of the inertial sensors, and performing temperature compensation on each of the inertial sensors through piecewise linear fitting or polynomial fitting;
  measuring a residual temperature error loop of each of the inertial sensors, and dividing the residual temperature error loops into a plurality of temperature windows at a predetermined temperature interval;
  minimizing a total error of each of the temperature windows through least squares fitting with constraints; and
  acquiring a set of temperature calibration coefficients of the inertial sensors so that the total error of each of the temperature windows is minimized, wherein the constraints are that a sum of the set of temperature calibration coefficients is 1.

14. The inertial measurement method according to claim 11, wherein a plurality of sets of temperature calibration coefficients of the inertial sensors are obtained through following operations:
  measuring a temperature response of the inertial sensing signal of each of the inertial sensors, and performing temperature compensation on each of the inertial sensors through piecewise linear fitting or polynomial fitting;
  measuring a residual temperature error loop of each of the inertial sensors, and dividing the residual temperature error loops into a plurality of temperature windows at a predetermined temperature interval; and
  acquiring a set of temperature calibration coefficients of each of the temperature windows through least squares fitting with constraints to minimize a total error of the each of the temperature windows, wherein the constraints are that a sum of the set of temperature calibration coefficients is 1.

15. The inertial measurement method according to claim 11, wherein the high-frequency component of the inertial sensing signal of each of the inertial sensors is multiplied by a corresponding noise reduction coefficient to obtain the noise reduced high-frequency component.

16. The inertial measurement method according to claim 15, wherein a set of noise reduction coefficients of the inertial sensors is obtained through following operations:
  measuring noise of the inertial sensing signal of each of the inertial sensors; and
  acquiring a set of noise reduction coefficients of the inertial sensors according to following formula to minimize a total noise:

$$N_{Total}^2 = N_1 * N_{a1}^2 + N_2 N_{a2}^2 + \ldots + N_n * N_{an}^2,$$

wherein $N_{Total}$ is the total noise, $N_{a1}$, $N_{a2}$, and $N_{an}$ are the noise of the inertial sensing signals a1, a2, and an, and $N_1$, $N_2$, $N_n$ are the noise reduction coefficients of the inertial sensing signals a1, a2, and an.

* * * * *